Aug. 23, 1966 J. A. GRANT 3,268,312
METHOD OF MAKING COATED GLASS FIBER COMBINATIONS
Original Filed Feb. 20, 1963

INVENTOR.
JOHN A. GRANT, DECEASED
BY ALBERTA B. GRANT
BY                EXECUTRIX

ATTORNEYS

United States Patent Office 3,268,312
Patented August 23, 1966

3,268,312
METHOD OF MAKING COATED GLASS
FIBER COMBINATIONS
John A. Grant, deceased, late of Granville, Ohio, by
Alberta B. Grant, executrix, Granville, Ohio,
assignor to Owens-Corning Fiberglas Corporation,
Toledo, Ohio, a corporation of Delaware
Continuation of application Ser. No. 260,349, Feb. 20,
1963. This application June 17, 1965, Ser. No. 467,817
12 Claims. (Cl. 65—3)

This application is a continuation of copending application Serial No. 260,349, filed February 20, 1963, which in turn was a continuation-in-part application of application Serial No. 802,232, filed March 26, 1959, now Patent Number 3,079,664, based upon prior application Serial No. 391,054, filed November 9, 1953, now Patent Number 2,915,806.

This invention relates to glass fibers and particularly to glass fibers coated with materials to provide strands, yarns and other textiles having increased wear or abrasion resistance and increased flexural life.

It is well known that glass fibers have extremely high tensile strengths but that at times they are somewhat limited in application by the fact that in general, they have low resistance to forces of abrasion. Bare glass fibers when rubbed against each other produce surface scratches which result in considerable reduction in tensile strength. In other words, the usable strength is often too low for specific applications. As an example, strands made of a plurality of bare glass fibers have tensile strengths practically equal to a multiple of the tensile strength of an individual fiber, but when such a strand is worked, as by flexing, or by twisting and plying, abrasion occurs at the interfaces of the fibers to inflict surface damage such that the tensile strength of the combination of fibers is greatly reduced. With a product such as this, the flexural life, or the number of times the strand may be flexed is quite limited.

It has been found that glass fibers may be coated with materials such as metals and resins to protect the surface and thereby retain the tensile strength of the fibers and at the same time greatly increase the flex life of groupings of fibers incorporated in a product. A long flex life is particularly desired in instances when glass fibers are to be utilized in yarns, cords, and ropes, or in fabrics such as sail cloth, awning material or tire cords where the material is subjected to considerable movement resulting in substantial wear at the interfaces of the fibers.

The wear properties at the interface of two surfaces of the same material, however, are not always ideal or even desirable. For instance, it is well known in the field of bearing manufacture that a steel face acting against another steel surface does not produce a good bearing interface. Correspondingly, a bronze surface against another surface of the same bronze does not provide a particularly good bearing interface. A bronze surface against a steel surface, however, results in an excellent bearing interface combination. This combination results in better bearing characteristics than when only one of the two metals is used in each of the contacting surfaces forming an interface. One advantage of the use of dissimilar metals is that frequently galling and seizure can be minimized. Use of one material in a combination with a high elastic limit is also a method by which plastic deformation may be reduced to prevent seizure under pressure. The use of one metal in a combination having a lubricating film or oxide coating, or a sulfide, chloride or phosphate coating has also been found to be helpful in improving the life of surfaces acting against each other. Resins such as polyethylene, tetrafluoroethylene, or a polyamide can also be applied to the glass fibers with similar results. Such resin coated fibers can be combined in textile forms with metal coated fibers or with other resin coated fibers such as phenolic coated or polystyrene coated fibers for relatively similar results.

In view of the foregoing, it is an object of this invention to provide a strand of glass fibers coated with dissimilar and complementary surface materials such that upon being grouped in such products as strands, yarns, and other textiles, improved wear properties are imparted to the product.

It is another object of this invention to provide a coating for glass fibers for protection of their surfaces and to permit formation of groupings of the glass fibers having dissimilar coating materials and thereby to promote retention of their tensile strength and an increase in their flex life in products and other instances where the fibers are caused to slide against each other when in pressure contact.

It is another object of this invention to provide an economical high speed method of making strands of glass fibers having coatings of more than one type.

It is still another object of this invention to provide a higher abrasion resistance in glass fibers grouped into products by coating the fibers with dissimilar materials having complementary physical properties in resisting damage from abrasion when movement is effected at their interfaces.

A further object of this invention is to provide a fabric made of glass fibers coated with dissimilar materials and so arranged as to impart to the fabric the advantages of increased abrasion resistance of the coating materials.

It is a feature of this invention that the application of coating materials to the glass fibers may be effected in the fiber-forming operations, thereby eliminating the need for treatment on a special handling basis and promoting economical production of coated fibers.

It is another feature of this invention that coating materials may be applied to the fibers at any of a range of temperatures in the fiber-forming operations, thus making the coating procedure flexibily adaptable to selectively impart a wide range of physical relationships between the coating material and glass fibers.

Other objects and features which I believe to be characteristic of my invention are set forth with particularity in the appended claims. My invention, however, both in organization in manner of construction together with further objects and advantages thereof may be best understood by reference to the following description taken in connection with the accompanying drawings in which:

Figure 1:
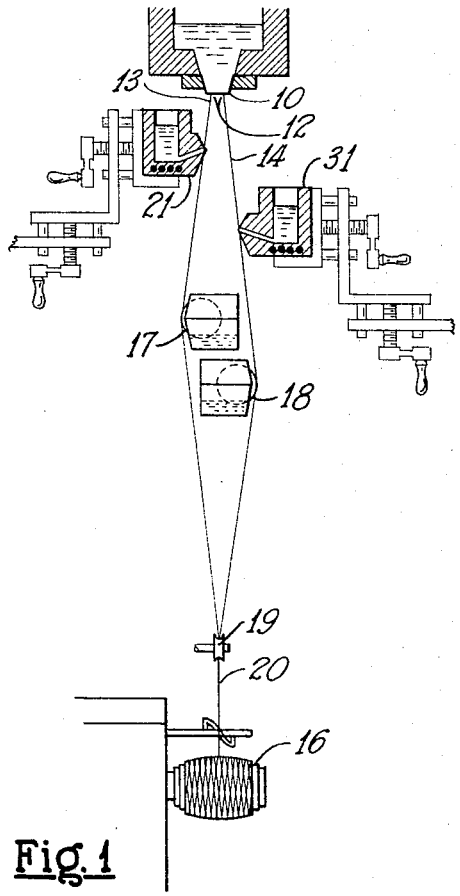
FIGURE 1 is a schematic side elevational view of an arrangement of apparatus for forming metal-coated glass fibers or filaments for incorporation in a strand made in accordance with the present invention.
Figure 2:
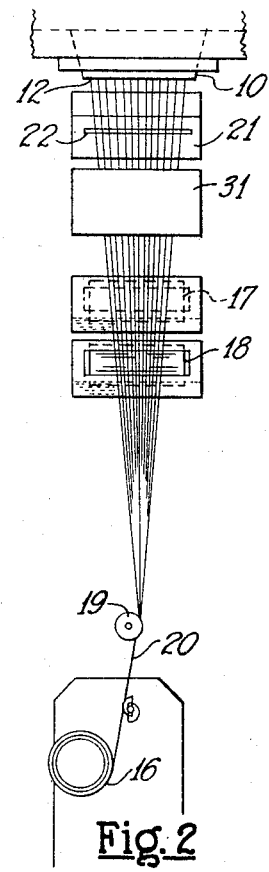
FIGURE 2 is a partially broken away front elevational view of the apparatus shown in FIGURE 1.

The principles of the present invention have been chosen to be explained herein with regard to a method by which metal may be coated on glass fibers during forming. Turning to the drawings in detail, FIGURES 1 and 2 show a general layout of fiber-forming and metal-coating apparatus including a suitable receptacle and feeder 10 for molten glass that may be heated in any conventional manner. The feeder 10 is provided with a series of outlets 12 in its bottom from which flow a plurality of streams of molten glass. Preferably, the outlets are all arranged in one or two rows so that the streams as they flow from the outlets can be readily divided into two separate groups of fibers 13 and 14 for application of separate metals thereto. If desired, however, more than two rows of outlets may be provided to flow streams that may be divided into groups. As the streams flow from the outlets 12 they are drawn out into fibers or filaments 13 and 14 by means of a rotating drum or a collet supported tube 16 which winds the strand while pulling on the filaments to draw out the streams.

A pair of separator rollers 17 and 18 which form a more positive division between the filaments 13 and 14 and a spinner-type gathering member 19 for collection of the filaments into a group or strand 20 are provided in positions intermediate the source of the streams of molten glass and the forming tube 16. Sizing materials may be applied to the filaments at the separator rolls 17 and 18. Sizing materials such as that set out in United States Patent 2,234,896 issued on March 18, 1940, or sizing materials which are predominantly lubricant in nature, such as petroleum oil, vegetable oil, molybdenum disulfide, or other recognized lubricants for metal may be used.

After the strand is formed, other treatment such as finishes might be applied to adapt it to specific uses. For instance, when the strand is to be used as reinforcement for product made of material such as rubber, plastics and the like, a finish which makes the strand compatible with the material with which it is combined is used. As an example, when combining metal-coated fibers with rubber, a finish is often used having one component common to both the adhesive and the finish. More specifically, if the adhesive has resorcinol formaldehyde latex as one of its constituents, then the finish likewise may have RFL as an ingredient.

The apparatus for applying metal to the fibers as they are formed comprises a pair of similarly constructed applicators 21 and 31. Each applicator has a graphite face over which the attenuated filaments pass as they are being coated. The metal in each of the applicators is maintained in a molten condition by heating units such as electrical resistant elements conductors of which are embedded within a suitable electrical insulation layer such as refractory cement or silicate fibers. The heater units are each provided with external terminals for connection to a suitable power source.

The interior of the applicators are lined with graphite or similar material capable of withstanding the temperatures of the molten metal to be contained. A channel within each of the units provides a path between the main body of the molten metal and the metal coating face. The metal flows from a slot at the face, such as slot 22, to form a longitudinal glob or strip of molten metal capable of enveloping each of the filaments passing therethrough. The slot is made sufficiently thin that the strip of metal emitted therefrom has a surface tension developed therein which provides sufficient retaining force to prevent free flow of the molten metal from the unit and which also suspends the strip in the space in front of the face without external support. Vertical grooves are provided in the face of the applicators to accommodate the filaments passed over the respective faces to permit them to pass through the molten strip or globule of metal closer to its base to assure positive envelopment of the filaments. Coating of metal on fibers in this manner permits unobstructed filament passage over the faces of the applicators through the grooves and additionally eliminates the need for modification of the fiber-forming methods generally in use.

The average temperature of molten glass in the manufacture of most glasses used in textile fibers is in the order of 2200° F. At a point some distance below the feeder outlets 12, this temperature drops to that of the surrounding atmosphere. By reason of extension of the drop in temperature of the filaments over an appreciable distance, a range of temperature levels exist from which a selection may be made for application of specific metals under most advantageous conditions. It has been found that the relationship of the temperature of the metal to the temperature of the glass at the point of application of the metal is quite important since the strength of the glass fibers may be impaired by extremely high metal temperatures if the proper relationships are not established. Thus, the level at which the applicators 21 and 31 apply the respective materials contained therein may be different depending upon the melting characteristics and physical properties desired of the materials.

Correspondingly, the application of sizing materials by roller separators 17 and 18 may be done at different levels below the point of application of metals to the filaments. It should be noted, however, that if the metals to be applied to the two groups of filaments are adapted to application at the same temperature levels, they may be supplied from a common unit with the two coating faces located between the groups, thereby making it unnecessary to dispose the roller separators between the two groups. That is, a common metal applicator unit could be made to function as a separator unit as well as an applicator unit, thereby permitting application of sizing material from the exterior of the two fans of filaments, if desired.

Although the application of metal to glass fibers is herein described as being applied by drawing the filaments through molten metal during forming, it will be readily recognized that metal can be applied to such fibers by other more conventional means. Metal coatings can be applied to glass fibers by evaporation methods, plating methods, as well as chemical reduction and spray methods. Utilization of such other methods, however, usually entails more time and apparatus than the method herein described, but nevertheless are adaptable to production of fibers with coatings of different metals. The metals in such instances are usually applied to the fibers after forming by separate treatment.

In tests of the factors involved in the selection of proper coating metals for combination within a strand, it has been discovered that they simulate closely those involved in the selection of metal combinations in the bearing art. Tests of flex life of glass strands with different metals reveal that flex life is considerably higher when the coefficient of friction is low at the interface of the materials on the individual fibers. Other properties of metal which operate with low friction to improve the wear life of abrading or rubbing surfaces are the anti-welding characteristics and compressive strength. In glass fiber products such as rope or fabric materials for sail cloth, awnings, or tire cords where considerable flex working is encountered, the ability of the coating material to conform to contours at its interface, in other words, its modulus of elasticity, is an important factor. A further and highly important factor is the metallurgical structure of the materials, particularly at the interface. For each metal coating material, there is a particular molecular or crystalline arrangement which is better in performance under a given set of fiber working conditions.

In view of the fact that wear life is a function of the coaction of all these factors, each of which is a complicated phenomenon when considered alone in detail, it will be apparent that a universal optimum material or combination of material will not readily be found. By proper selection of dissimilar complementary materials, however, the wear life of groupings of glass fibers, such as in strands, fabrics and cord products, can be increased appreciably over the life of corresponding products made of fibers coated with either material of such combinations alone. The selection of combinations, providing improved wear life, however, usually entails a trial and error mating for each specific application based on previous wear experiences and knowledge available from the bearing art.

Figure 3:
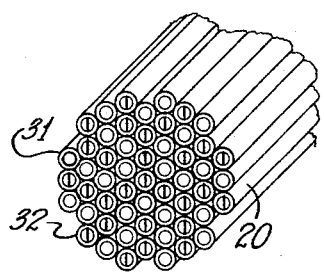
FIGURE 3 is a perspective view of the end of a strand made up of fibers coated with dissimilar materials.
Figure 3A:
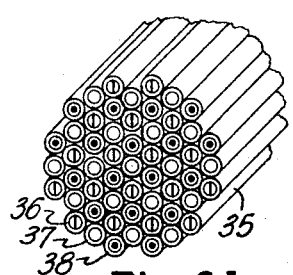
FIGURE 3a is a perspective view of the end of a strand of oriented fibers coated with three dissimilar materials.

FIGURE 3 shows a strand 20 of glass fibers each of which is individually coated with a material, but some of the fibers being coated with one material 31 such as zinc while the remainder are coated with another material 32 (designated by a line through the glass core) selected for its complementary, physical characteristics in providing long wear life to the strand. Similar coatings on filaments of each of the strands shown in FIGURES 3 and 3a are distinguished by dot and dash identification marks as well as the absence of marks on the ends of the glass filaments. It will be noted here that the fibers are grouped together in somewhat random arrangement within the strand which on consideration will indicate that a maximum number of interfaces of dissimilar materials will not always be provided. The increased life of such randomly grouped fibers, however, is submitted to be a result of the fact that at least some of the interfaces being formed by contact of dissimilarly coated fibers results when fibers coated with one material are located on one side of a line passing through the strand while all fibers coated with another material lie on the opposite side. The greater the distribution in random arrangements other than this definite division, the larger is the number of interfaces formed by contact of dissimilarly coated fibers, and correspondingly is the wear life prolonged. The increased wear properties of coated fibers are particularly desirable in production of yarns wherein the fibers are subjected to the forces of twisting and plying.

Metals that may be applied to glass fibers and combined in product groupings of coated fibers as wear resistant combinations include zinc, copper, aluminum, nickel, tin, lead, alloys of these metals and others. For example, zinc which has a melting point of 786° F. and a hardness of approximately 100 Brinell can be coated on glass fibers and advantageously associated for wear with fibers coated with a tin base alloy such as Babbitt metal having a composition of 65.5% tin, 18.2% lead, 14.1% antimony and 2% copper having a melting point of 358° F. and a hardness of about 23 Brinell. Additional metal combinations which may be cited as examples include heavyduty lead base Babbitt with zinc base bearing alloys, stainless steel with leaded tin bronze, aluminum base alloys and bronze, steel and graphite bronze and numerous others. In view of the range of physical properties obtainable in the different types of alloys falling within broad classifications such as zinc base alloys, combinations of alloys complementary in physical properties but of somewhat similar compositions will often provide desirable increase in wear resistance.

The oxides or other compounds of the metals when formed on the coating surface often give an increased wearability. The incorporation of one metal that forms a sort of lubricating film or a thin coat of sulfide, chloride or phosphate often has this effect and the selection of combinations are made with these facts in mind. It is also possible in many instances to plate one metal with indium to increase wear resistance. Indium has an additional advantage in that it protects against corrosion.

It should be noted that improved wear life according to the present invention is not necessarily limited to mating of metals only, but the principles are intended to be extended to metals complementarily mated with other materials such as graphite coated on glass as by drawing the fibers through wax and then applying graphite particles, as well as to mating of other dissimilar non-metallic materials adapted to providing long contact life as bearing-like combinations.

FIGURE 3a shows a strand 35 with an oriented arrangement of fibers coated with three different materials illustrating how all interfaces of the fibers can be formed by contact of different materials to prolong wear life. Three types of interfaces exist in the arrangement; one formed by contact of fibers coated with materials 36 and 37, another by fibers coated with materials 37 and 38, while the third is formed by fibers coated with materials 38 and 36. It should be noted in this arrangement that one of the groups of fibers might be left bare without deviating from the principles of the invention.

Figure 4:
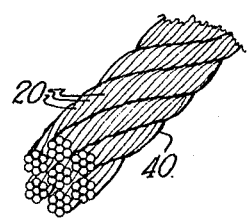
FIGURE 4 is a perspective view of the end of a cord made up of glass filaments coated with dissimilar materials.

FIGURE 4 shows a glass fiber cord 40 made of twisted strands of the type shown in FIGURE 3. It will be recognized that the number of interfacial contact points between the dissimilar material will tend to be greatly multiplied by twisting of the individual strands, and that the further twist of the strands over each other will promote even more approach to a maximum number of such contact points between dissimilar materials.

Figure 5:
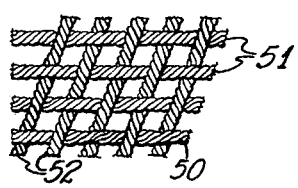
FIGURE 5 is a view of a piece of woven fabric made of strands of glass fibers coated with dissimilar materials.

FIGURE 5 shows a woven fabric 50 made in accordance with the principles of this invention including yarns incorporating filaments coated with two different materials. It is to be understood that the fabric may be woven of yarns made of strands similar to that shown in FIGURE 3 and that the maximum number of interfacial contacts by dissimilar materials will be promoted by the approach to thorough distribution as in the cord of FIGURE 4, but as illustrated in the present instance, the fabric has been shown as woven with yarns each of which has all of its filaments coated with the same material. Thus, the yarns 51 woven in one direction have fibers coated with one material while the yarns 52 extending crosswise at a 90° angle thereto comprise fibers coated with another material complementary to the first to provide improved wearability. The crossover points of yarns on this fabric, it will be noted, are all formed by an overlay or contact of yarns of the dissimilar materials, and tendencies toward contact by portions of yarn surfaces of similar coating materials are almost negligible in view of the form of the weave. Thus, the increased wear afforded by contact of dissimilar materials is positively incorporated in the fabric.

In view of the various illustrated forms in which fibers of dissimilar materials can be incorporated for increased wear of glass fibers in textile products, it is apparent that the basic principles of this invention have broad application in improving the wearability of the coated glass fibers.

In another form of the invention, one set of filaments can have a coating of a resin, while the other set of filaments can have a coating of a catalyst for the resinous material. For example, one set of filaments can be coated with an epoxy resin while the other set can be coated with an amine material which remains as a coating for filaments in the strand until a reaction is triggered, such as by heat, to effect conversion of the epoxy to a cured state.

In still another arrangement, materials can be introduced to the filaments simultaneously or sequentially so that a reaction occurs on the filaments to produce a reacted coating thereon during the process of their formation, and prior to full combination in a common strand. In this regard, a group of filaments such as group 13 in FIGURE 1 can be coated in sequence with a combination of materials, namely, a solvent solution of adipyl chloride at the applicator 21, and upon subsequent passage over the applicator 17 with a 5 to 25% solution of hexane diamine in water. Equal quantities of these two materials have been found to react substantially instantaneously to form a polyamide, prior to combination or joinder at a gathering member 19. Such polyamide coatings are hard and tough, and lend themselves to working association with coated filaments for improved wearability. As previously recited, metal coatings can be applied to the filaments 14 by way of the applicator 31. Such metal coatings might be zinc, lead, aluminum or alloys thereof, which lend themselves admirably to providing increased wearability in sliding contact with polyamide materials.

Such dissimilar coated filaments when twisted into a textile structure can be used to provide a bead structure for tires. Such tire structures can also be reinforced by filaments coated with either an epoxy or polyamide system in which the acid chloride or epoxy can be applied at one applicator and a curing agent such as a diamine can be applied at a following applicator.

The materials applied to the filaments can also be selected to either precipitate or catalyze resinous coatings to produce a water-insoluble, temperature-resistant end product. Examples of such materials are aluminum and unsaturated resinous compositions containing chlorides to produce an aluminum chloride selected to cause an alkaline type reaction. Dibasic organic acids also can be combined with materials such as aluminum or magnesium for such purposes.

In still another form of this invention, resinous coatings of material such as a polyamide, can be applied in the forming process with an excess of the amine such as hexamethylene present to effect formation of the polyamide, but with sufficient amount extra of such amine to react with a resinous coating material such as an epoxy, for example Oxiron, on another set of filaments. Sufficient catalyst may be provided in the cured polyamide coated filaments so that after joinder of the two groups of filaments in a common strand, a cure, or polymerization of the epoxy can be effected by subsequent triggering with heat. A high vapor pressure catalyst such as ethylene diamine premeating the epoxy or acid chloride can be used for this purpose to produce the polyamide or epoxy resin. Such a process lends itself to permitting twisting of filaments into a yarn, and by subsequent triggering such as with heat to effect polymerization of the resin and an interlocking of the total group of filaments to at least a semi-set condition in which the resulting yarn is less likely to untwist or be wild in character. The result of the use of this process is also a high strength material provided through proper protection and interbonding or interlocking of the filaments within the yarn structure.

The heating of the filaments in such a process, it is to be understood, can also be effected subsequent to the twisting and fabrication of the yarns. In this respect, the metal coated filaments in combination with the resinous coating lend themselves to utilization of electrical induction and even conductive heating because of the presence of the metal. In other words, the non-conductive resin can be heated electrically because of the presence of electrically conductive coatings in the combination.

Further in this respect, the yarns might also be woven into a cloth prior to the heating step in which final polymerization is effected. The invention, as exemplified by this latter form, has the advantage that a resin which is slow to catalyze can be applied to filaments in high speed fiber-forming processes, and at the same time provide all the constituents necessary to effect a full cure of such material without actually taking the time during forming to effect such cure. The curing of the material can then be effected in slower fabricating processes, such as weaving, without causing undue slow-up of the process, and accordingly enabling more economic manufacture of the resulting products.

In considering the weaving of two separate materials into a fabric, the resin systems can be woven into a fabric and upon being cured, can be made to lock-weave the strands or yarns into the product. That is, the cross-over points of the yarns can be cured to fuse or lock the points of intersection into a fixed structural condition. In this sense, any of a number of non-woven net, scrim, or screen products can be produced.

While certain particular forms of the invention have been shown, it will be understood that the invention is not to be limited thereto since many modifications may be made within the broader concepts of the disclosure, and it is therefore contemplated by the appended claims to cover all such modifications that fall within the spirit and scope of the invention.

What is claimed is:

1. The method of making flexible coated glass-fiber strands of glass fibers coated with dissimilar materials comprising flowing streams of glass from a source of molten glass, attenuating said streams into fibers while in a state of plasticity, separating the streams into groups corresponding in number to the number of coating materials to be provided for the fibers in the strand, applying the respective coating materials on the separated groups of fibers, and then drawing the fibers together into a composite strand of the dissimilarly coated fibers.

2. The method of forming continuous strands of coated glass-fibers having outer coatings of dissimilar metals comprising flowing streams of glass from a source of molten glass, attenuating said streams into fibers while in a state of plasticity, dividing the streams into separate groups corresponding in number to the different outer coating metals to be provided for fibers in the strand, applying the metals in molten condition to their respective groups of fibers at the temperature level corresponding to that for effecting the adhesive relationship desired between the respective metals and the fibers which they coat, and then drawing said coated fibers together into a composite strand of the dissimilarly coated metals after the metals have cooled below a softened condition.

3. The method of making flexible coated fiber strands of fibers coated with dissimilar materials comprising flowing streams of heat softenable material from a source of a molten form of the material, attenuating said streams into continuous fibers, separating the continuous fibers as they are being attenuated into different lineally moving groups corresponding in number to the number of coating materials being provided for the fibers in the strand, applying the respective coating materials on each of the continuous fibers in the separated groups of fibers, then drawing the separated groups of coated fibers together into a composite strand of the dissimilarly coated fibers.

4. The method of claim 3 wherein the fibers are separated into different groups by the coating applicators providing the different materials to the respective groups.

5. The method of making flexible coated glass fiber strands of glass fibers coated with dissimilar materials comprising flowing streams of glass from a source of molten glass, attenuating said streams into continuous fibers, separating the continuous fibers as they are being attenuated into two different moving groups, applying a coating of resin on the filaments of one of said moving groups and applying a coating of a catalyst for said resin on the other of said groups of fibers, drawing the separated groups of coated fibers together into a composite strand of the resin and catalyst coated fibers, and then triggering a reaction between the resin and catalyst materials on the filaments in said composite strand.

6. The method of making flexible coated glass fiber strands of glass fibers coated with dissimilar materials comprising flowing streams of glass from a source of molten glass, attenuating said streams into continuous fibers, separating the continuous fibers as they are being attenuated into two linearly moving groups, supplying two dissimilar quick reacting materials to fibers of one of said groups of fibers as they are being formed to provide a reacted coating of said materials on the fibers of said one group, applying a dissimilar coating material compatible in character for improved wearability with said reacted coating materials, then drawing the separated groups of coated fibers together into a composite strand.

7. The method of making flexible coated glass fiber strands of glass fibers coated with dissimilar materials comprising flowing streams of glass from a source of molten glass, attenuating said streams into continuous fibers, separating the continuous fibers as they are being attenuated into two linearly moving groups, applying on the continuous fibers of one of said groups a coating of resinous material containing an excess of catalyst, applying a coating of uncatalyzed resin on the fibers of the other of said groups, said uncatalyzed resin being of a type which will react with said catalyst, then drawing the separated groups of said coating fibers together into a composite strand of dissimilar coated fibers.

8. The method of making a coated fiber product of glass fibers coated with dissimilar materials comprising flowing streams of glass from a source of molten glass, attenuating said streams into continuous fibers, separating the continuous fibers as they are being attenuated into two linearly moving groups, applying on the continuous fibers of one of said groups a coating of resinous material containing an excess of catalyst, applying a coating of uncatalyzed resin on the fibers of the other of said groups, said uncatalyzed resin being of a type which will react with said catalyst, drawing the separated groups of said coated fibers together into a composite strand of dissimilar coated fibers, and then triggering the reaction between the excess catalyst on the fibers of the one group with the material coated on the fibers of said other group.

9. The method of claim 8 wherein the fibers are twisted into a yarn prior to triggering of the reaction between the dissimilar materials.

10. The method of claim 8 wherein the strand of dissimilar coated fibers are woven into a fabric prior to triggering the reaction between said dissimilar coating materials.

11. The method of making a textile strand product of glass fibers coated with dissimilar materials comprising flowing streams of glass from a source of molten glass, attenuating said streams into continuous fibers, separating the continuous fibers as they are attenuated into two linearly moving groups, applying on the continuous fibers of one of said groups a coating of a material reactive with another material, and applying a coating of said other material on the continuous fibers of other of said groups, and drawing the separated groups of continuous fibers coated with said reactive materials together into a composite strand.

12. The method of making flexible coated glass-fiber strands of glass fibers coated with dissimilar materials comprising flowing streams of glass from a source of molten glass, attenuating said streams into fibers while in a state of plasticity, separating the streams into groups corresponding in number to at least the number of coating materials to be provided for the fibers in the strand, applying the respective coating materials on the separated groups of fibers, and then drawing the fibers together into a composite strand of the dissimilarly coated fibers.

References Cited by the Examiner

UNITED STATES PATENTS

| | | | |
|---|---|---|---|
| 2,772,518 | 12/1956 | Whitehurst et al. | 65—3 |
| 2,778,764 | 1/1957 | Morrison | 156—296 |
| 2,939,761 | 6/1960 | Stein | 156—167 |

DONALL H. SYLVESTER, *Primary Examiner.*

R. L. LINDSAY, *Assistant Examiner.*